United States Patent [19]
Lewis et al.

[11] 3,804,645
[45] Apr. 16, 1974

[54] VANADIUM CONTAINING ALKALI METAL-LEAD-PHOSPHATE GLASS

[75] Inventors: Cyril John Lewis; Neil Hunter Ray; William Derek Robinson, all of Runcorn, England

[73] Assignee: Imperial Chemical Industries Limited, London, England

[22] Filed: Sept. 28, 1972

[21] Appl. No.: 293,154

[30] Foreign Application Priority Data
Oct. 15, 1971 Great Britain.................... 48104/71

[52] U.S. Cl................................... 106/50, 106/47 R
[51] Int. Cl.......................... C03c 13/00, C03c 3/16
[58] Field of Search............ 106/47 R, 50, 53, 47 Q

[56] References Cited
UNITED STATES PATENTS
3,585,057   6/1971   John................................. 106/47 Q
3,485,646   12/1969   Junge............................... 106/47 R Primary Examiner—A. B. Curtis
Assistant Examiner—Mark Bell
Attorney, Agent, or Firm—Cushman, Darby & Cushman

[57] ABSTRACT

The addition of small quantities of $V_2O_5$ to low-softening potassium/lead phosphate glasses improves their water resistance. The use of larger quantities of $V_2O_5$ may give crystal formation in the glass. Potassium may be replaced by other alkali metals.

Glasses having the composition (moles percent) $P_2O_5$, 46–61; PbO, 12–32; alkali metal oxide, 15–21; $V_2O_5$, 1.2–1.5; Group 2 metal oxides (excluding mercury), 0–6 are disclosed.

11 Claims, No Drawings

VANADIUM CONTAINING ALKALI METAL-LEAD-PHOSPHATE GLASS

This invention relates to inorganic oxide glass compositions and to composite products comprising such compositions.

The invention provides inorganic oxide glasses having compositions within the range (in moles percent):

| | |
|---|---|
| $P_2O_5$ | 46–61 |
| PbO | 12–32 |
| alkali metal oxide | 15–21 |
| $V_2O_5$ | 1.2–1.5 | and a total of 0–6 moles percent of oxides of Group 2 metals (excluding mercury), there being present no more than 3.0 moles percent, preferably no more than 2.5 moles percent and more preferably no more than 2.0 moles percent of the oxide of any one Group 2 metal, the total of all the above components being at least 99 moles percent of the total composition, excluding water. Preferably at least half of the alkali metal oxide is $K_2O$. Examples of other suitable alkali metal oxides include $Li_2O$ and $Na_2O$. There may also be present a small proportion, up to, say, 1 percent of minor constituents such as $SiO_2$, $Al_2O_3$ and $B_2O_3$.

Preferably the $P_2O_5$ content is 54–58 moles percent, and the PbO content is 18–23 moles percent. Examples of technically suitable Group 2 metal oxides are MgO, BaO and CdO, although it may be desirable in practice to omit CdO in view of the known toxicity of cadmium compounds.

We have found that glasses according to the present invention tend to have better resistance to attack by water than do similar potassium/lead-phosphate glasses containing no vanadium pentoxide. We have also found that potassium/lead-phosphate glass compositions containing vanadium pentoxide in proportions outside the proportions indicated usually contain crystals which tend to reduce the strength of the glass, particularly when the glass is in fibre form. Surprisingly we found that substantial freedom from crystals could be obtained in glass compositions according to the invention.

The glasses of the invention may be suitable for co-processing with organic polymers in composites as described in our copending British Pat. application No. 18481/70 and with inorganic components as described in our co-pending British Pat. application No. 24386/71. The water resistance of the glasses of the invention is particularly valuable in enabling glass fibres to be spun and used without a protective coating under conditions where water resistance is desirable.

The glass may be prepared by heating together the appropriate oxides, or their precursors. By 'precursor' is meant a compound which on heating will react with the other components present to give the same chemical composition in the product as if the oxide had been used, usually with the evolution of one or more volatile compounds for example water, carbon dioxide and ammonia. Thus suitable precursors of phosphoric oxide include phosphoric acid and ammonium phosphates, while carbonates may be used as precursors of metal oxides. Mixtures of an oxide and a precursor of that oxide, or of two or more precursors of the same oxide may be used, and the same compound may be used as a precursor of more than one oxide, thus for example potassium phosphate is a precursor of $K_2O$ and $P_2O_5$.

The heating may be carried out in a two-stage process, in which some or all of the components are first heated together at a relatively low temperature, for example 300°–500°C, to give a glassy mixture (conveniently referred to as the premelt), which is then refined at a higher temperature, for example 500°–800°C. If less than all of the components are present at the initial heating stage the remaining material may be added subsequently before or during the refining stage. This method is convenient for small scale laboratory preparations, but alternatively the components may be mixed together and heated for example to 500°–800°C in a single stage operation. The addition of the components may be made all at once or sequentially in a batch process, but it may be desirable, particularly when operating upon a large scale, to form the glass in a continuous process in which the mixture of components is continually or periodically being added to, and glass removed from, a reaction vessel maintained at the refining temperature.

During refining water is gradually lost, the glass network becomes more highly crosslinked, and the viscosity and transformation temperature (Tg) of the glass increase. Small amounts of volatile oxide components, for example $P_2O_5$, may be lost during the refining stage, and it is desirable to keep the temperature below 800°C when refining glasses according to the invention, to minimise any such loss.

A glass of a given composition may have a range of physical properties, depending upon the refining conditions, and a glass having any desired properties within this range may be obtained by routine experimentation involving selection of the appropriate conditions, for example time, temperature and batch size, in the refining step. The length of refining time required for a particular glass composition to reach a particular transformation temperature cannot be specified, as it depends upon the size of the batch, the type of furnace and crucible used, the exact temperature of the furnace, the furnace atmosphere and other variables. However, if a given glass composition is refined until it reaches a given transformation temperature, which may be determined by differential thermal analysis of a cooled sample of the glass, properties such as water resistance will be reproducible from one batch of that composition to another. The residual water in glasses according to the invention may represent up to 5 percent by weight of the total, but is not included in the compositions set out above, which may be regarded as nominal molar compositions, in that they are based upon the composition of the initial mixture of components.

The rate at which the glasses are attacked by water may be expressed either as the rate of loss of weight of a standard sample expressed in units of percent/min at a given water temperature, or as the rate of erosion of a glass surface expressed in units of microns/min. at a given temperature, and in the present application both measurements are used, the relevant units being indicated in each case.

The rate of loss of weight at the boiling point of water is determined by the following procedure: Approximately 2g of molten glass is poured on to a steel plate and allowed to cool. The resulting smooth disc of glass, approximately 2cm in diameter and 0.3cm thick, is weighed, immersed in boiling water for 1 hr., dried and reweighed. The weight loss divided by the initial weight and multiplied by 100/60 gives the percentage weight loss/minute.

For glasses having good resistance to attack by water an alternative test method, enabling calculation of the rate of erosion of the surface at 20°C, is preferred, since this gives more accurate results. According to this procedure, the glass is ground and sieved to provide approximately 10g of glass powder of particle size 300–500μm (30–52 mesh BS410). Approximately 5g of the powdered glass is added to a weighed sintered glass crucible having a No. 3 sinter, that is, a sinter having an average pore diameter of 20–30μm. The contents of the crucible are washed with distilled water then with acetone and dried under a vacuum of less than 1 mm Hg air pressure at room temperature for 30 min.

The crucible and its contents are then weighed accurately to determine the initial weight of the glass. A constant-head device is then arranged to maintain a level of 3cm of distilled water at 20°C in the crucible, which ensures that water flows through the sinter at a rate of approximately 4 ml/min. After 24 hours the crucible and its contents are washed with acetone, dried in vacuum as described above and reweighed to determine the final weight of the glass.

The rate of solution is calculated from the equation $$X = 0.28 \left[1 - (W_2/W_1)^{1/3}\right]$$

where
$X$ = rate of solution (μm/min)
$W_1$ = initial weight of glass (g)
$W_2$ = final weight of glass (g)

The mean of two determinations is taken. As a rough indication of the correlation between the two methods, a weight loss at 100° of 0.01 percent/min corresponds approximately to a rate of surface erosion at 20°C of $3 \times 10^{-4}$ μm/min.

The transformation temperature of the glass is determined by differential calorimetry using the Du Pont Differential Thermal Analyser. A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

Examples 1–8 illustrate glass compositions according to the invention, Examples 9 and 10 describe for the purposes of comparison glass compositions outside the scope of the invention, and Example 11 illustrates the formation of glass fibre from glass according to the invention.

EXAMPLE 1

2.5 kg. of vanadium containing glass was prepared in two stages:
a. a premelt was prepared having the nominal composition $P_2O_5$, 55.9; PbO, 20.6; $K_2O$, 18.7; MgO, 1.2; BaO, 1.2; CdO, 1.2; $V_2O_5$, 1.2 moles percent by stirring together 2160g 88 percent orthophosphoric acid, 800g litharge, 448g potassium carbonate, 8.5g magnesium oxide, 32.3g barium oxide, 27.1g cadmium oxide, 38.4g vanadium pentoxide. This mixture was stirred at room temperature until carbon dioxide evolution was complete, and it was then heated and stirred for 6 hours at 300°–400°C.
b. the resulting mixture was then cooled to a solid premelt which was broken into pieces and the pieces placed in a clay bonded graphite crucible heated to 700°C to be refined. To assist in the refining process a controlled air stream was passed through the furnace. The refining was carried out until a sample of the glass had a transformation temperature of 200°C. The refined glass was then run into a shallow stainless steel tray and allowed to solidify.

The glass obtained was free of crystalline inclusions, and had the following properties:
Transformation temperature 200°C
Density — 3.03g/cm³
$10^5$ — Nsm$^{-2}$ ($10^6$ poise) temperature — 310°C
Rate of solution in water at 100°C — 0.01 percent per minute
Rate of erosion by water at 20°C — $1.4 \times 10^{-4}$ μ/min Rate of devitrification — not detected.

EXAMPLE 2

The preparation described in Example 1 was repeated, omitting cadmium oxide and increasing the content of magnesium oxide to 17.0g to give a glass having the composition (moles %) $P_2O_5$, 55.9; PbO, 20.6; $K_2O$, 18.7; MgO 2.4; BaO, 1.2; $V_2O_5$, 1.2.

The glass was free of crystalline inclusions, and had a transformation temperature of 190°C and a rate of erosion by water at 20°C of $1.0 \times 10^{-4}$ μ/min.

EXAMPLE 3

A premelt was prepared having the nominal composition $P_2O_5$, 60.8; PbO, 25.3; $K_2O$, 10.1; BaO, 1.3; MgO, 1.3; CdO, 1.3 moles percent by mixing together in a borosilicate glass beaker at room temperature 2,003g 88 percent orthophosphoric acid, 837g litharge, 207g potassium carbonate, 28.8g barium oxide 7.5g magnesium oxide and 24.3g cadmium oxide. When evolution of carbon dioxide ceased, the mixture was heated and stirred at 300°–500°C, then allowed to cool and broken into small pieces.

20g of the premelt was placed in a platinum dish and heated in a furnace at 700° for 15 minutes, then 0.3g of vanadium pentoxide and 5.5g potassium carbonate was added to the molten premelt, and the dish was returned to the furnace for 10 minutes to allow the added batch to dissolve, then for a further 1 hour during which the glass was refined. The resulting glass had a composition (mole percent) of $P_2O_5$, 56.4; PbO, 23.5; $K_2O$, 15.6; MgO 1.1; BaO, 1.2; CdO, 1.2; $V_2O_5$ 1.2; was free of crystalline inclusions, had a transformation temperature at 225°C and a rate of solution in water at 100°C of 0.01 percent/min. After further refining for 8 hours at 700°C the cooled glass showed no crystalline inclusions.

EXAMPLE 4

To 20g of the premelt described in Example 3 was added 0.3g vanadium pentoxide and 6.6g potassium carbonate and refining was carried out as described in Example 3 to give a glass of composition (mole percent) $P_2O_5$, 54.7; PbO, 22.8; $K_2O$, 18.1; MgO, 1.1; CdO, 1.1; $v_2O_5$, 1.2; The glass was free of crystalline inclusions, and had a rate of solution in water at 100°C of 0.01 percent/min.

EXAMPLE 5

A premelt was prepared having the nominal composition $P_2O_5$, 46.25; PbO, 31.25; $K_2O$, 17.5; MgO, 1.25; BaO, 1.25; CdO, 1.25; $V_2O_5$, 1.25 moles percent by heating together as described in Example 3 a mixture of 1030g 88 percent orthophosphoric acid, 697g litharge, 242g potassium carbonate, 8.9g magnesium oxide, 19.2g barium oxide, 16.1g cadmium oxide and 22.7g vanadium pentoxide. After refining for 1 hour at 700°, the resulting glass had the following properties: transformation temperature 286°C, rate of solution in water at 100°C 0.02 percent/min. No crystals were present in the glass.

EXAMPLE 6

A premelt was prepared having the nominal composition $P_2O_5$, 60; PbO, 15; $K_2O$, 20; MgO, 1.3; BaO, 1.3; CdO, 1.3; $V_2O_5$, 1.3 moles percent by mixing together in a borosilicate glass beaker a mixture of 2665g 88 percent orthophosphoric acid, 670g litharge, 554g potassium carbonate, 10.4g magnesium oxide, 39.8g barium oxide, 33.4g cadmium oxide and 47.4g vanadium pentoxide, and heating as described in Example 3.

A portion of the premelt was refined for 1 hour at 700°C, giving a glass of the above composition which was free of crystalline inclusions, and had a transformation temperature of 200°C and a rate of solution in water at 100°C of 1.0 percent/min.

EXAMPLE 7

A glass having the following composition (moles percent) $P_2O_5$, 60; PbO, 15; $K_2O$, 20; BaO, 1.25; CaO, 1.25; CdO, 1.25; $V_2O_5$, 1.25 was made by heating together the appropriate oxides and precursors at 450° and refining for 1 hour at 700°C. The resulting glass had a transformation temperature of 192°C, a rate of solution in water at 100°C of 0.0015 percent/min and a density of 3.02g $cm^{-3}$.

EXAMPLE 8

A glass having the following composition (moles %) $P_2O_5$, 60; PbO, 15; $K_2O$, 10; $Li_2O$, 10; BaO, 1.25; MgO, 1.25; CdO, 1.25; $V_2O_5$ 1.25, was prepared by forming a premelt in the normal way and refining at 700°C for 1 hour. The resulting glass had a transformation temperature of 197°C, a rate of solution in water at 100°C of 0.001 percent/min, and a density of 3.02g $cm^{-3}$.

EXAMPLE 9

This example illustrates the properties of a glass similar to that of Example 3, but containing no vanadium.

The premelt described in Example 3 was refined for 1 hour at 700°C without any further additions of material, to give a glass of the following composition: $P_2O_5$, 60.8; PbO, 25.3; $K_2O$, 10.1; MgO 1.3; BaO, 1.3; CdO, 1.3 moles percent.

The glass contained no crystalline inclusions, had a transformation temperature of 173°C, and had the relatively high rate of solution in water at 100°C of 2.0 percent/min.

EXAMPLE 10

This example illustrates the properties of a glass similar to that of Example 6, but containing more $V_2O_5$ than the glasses according to the present invention.

A glass of composition (moles percent): $P_2O_5$, 61.5; PbO, 15.4; $K_2O$, 20.5; $V_2O_5$, 2.6 refined for 1 hour at 700°C had a transformation temperature of 183°C, a rate of solution in water at 100°C of 0.5 percent/min, and contained crystalline inclusions in the form of square platelets or cubes. Separation and analysis of the crystals indicated an approximate empirical formula of $V_2O_5 \cdot 2P_2O_5$ (vanadyl pyrophosphate).

EXAMPLE 11

A sample of the glass described in Example 2 was melted in a platinum crucible having seven 1-mm holes drilled in its base. With the glass melt at 370°C fibres were drawn from the seven holes and wound up on to a 33 cm diameter drum driven by an electric motor. The wind-up speed was increased until the average fibre diameter was 10 microns and the draw-speed for each filament was 14 metres per second. A total of 200g of fibre was collected. Its mean tensile strength was 40 $MNm^{-2}$ and its average modulus was 26.5 $GNm^{-2}$.

What we claim is:

1. Inorganic oxide glasses free of mercury having compositions within the range (in moles percent)

| | |
|---|---|
| $P_2O_5$ | 46–61 |
| PbO | 12–32 |
| alkali metal oxide | 15–21 |
| $V_2O_5$ | 1.2–1.5 | and a total of 0–6 moles percent of oxides of Group 2 metals, there being present no more than 3.0 moles percent of the oxide of any one Group 2 metal, the total of all the above components being at least 99 moles percent of the total composition.

2. Inorganic oxide glasses as claimed in claim 1 in which at least half of the alkali metal oxide is $K_2O$.

3. Inorganic oxide glasses as claimed in claim 2 in which all the alkali metal oxide is $K_2O$ and in which there is present no more than 2.0 moles percent of the oxide of any one Group 2 metal.

4. Inorganic oxide glasses as claimed in claim 1 in which the content of $P_2O_5$ is 54–58 moles percent.

5. Inorganic oxide glasses as claimed in claim 1 in which the content of PbO is 18–23 moles percent.

6. Inorganic oxide glasses as claimed in claim 1 in which the content of $P_2O_5$ is 54–58 moles percent and that of PbO is 18–23 moles percent.

7. Inorganic oxide glasses as claimed in claim 1 in which the Group 2 metal oxide components are selected from MgO, BaO and CdO.

8. Inorganic oxide glasses as claimed in claim 7 which includes MgO, BaO and CdO.

9. Inorganic oxide glasses as claimed in claim 7 which includes MgO and BaO.

10. A method of preparing an inorganic oxide glass comprising the steps of taking inorganic oxides or their precursors in the molar proportions according to claim 1, and heating them together at a temperature not greater than 800°C.

11. Glass fibres obtained by melt-spinning a glass as claimed in claim 1.

* * * * *